US012367064B2

(12) United States Patent
Parkinson et al.

(10) Patent No.: US 12,367,064 B2
(45) Date of Patent: Jul. 22, 2025

(54) MANAGING GLOBAL AND LOCAL EXECUTION PHASES

(71) Applicant: Microsoft Technology Licensing, LLC, Redmond, WA (US)

(72) Inventors: Matthew John Parkinson, Cambridge (GB); Sylvan Wesley Clebsch, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/043,152

(22) Filed: Jul. 23, 2018

(65) Prior Publication Data

US 2020/0004577 A1    Jan. 2, 2020

(30) Foreign Application Priority Data

Jun. 28, 2018 (GB) ...................................... 1810644

(51) Int. Cl.
*G06F 9/48* (2006.01)
*G06F 9/50* (2006.01)

(52) U.S. Cl.
CPC .............. *G06F 9/48* (2013.01); *G06F 9/5016* (2013.01); *G06F 9/5022* (2013.01)

(58) Field of Classification Search
None
See application file for complete search history.

(56) References Cited

U.S. PATENT DOCUMENTS

| 7,587,581 | B2 | 9/2009 | Joy et al. |
| 8,103,643 | B2 | 1/2012 | Danilov et al. |
| 8,429,658 | B2 | 4/2013 | Auerbach et al. |
| 8,694,706 | B2 | 4/2014 | Dice et al. |
| 2002/0087769 | A1* | 7/2002 | McKenney ............... G06F 9/52 710/200 |
| 2004/0210695 | A1 | 10/2004 | Weber et al. |

(Continued)

OTHER PUBLICATIONS

Hart, Thomas Edward., "Comparative Performance of Memory Reclamation Strategies for Lock-free and Concurrently-readable Data Structures", In Thesis of University of Toronto, Jan. 2005, 104 Pages.

(Continued)

*Primary Examiner* — Bradley A Teets
*Assistant Examiner* — Melissa A Headly
(74) *Attorney, Agent, or Firm* — Barta Jones, PLLC

(57) ABSTRACT

A method of running a computer program comprising concurrent threads, wherein: at any time, the program is in a current global execution phase, GEP, each thread is divided into a sequence of local execution phases, LEPs, each corresponding to a different GEP, wherein the thread is in a current LEP that cannot progress beyond the LEP corresponding to the current GEP; any of the threads is able to advance the GEP if the current LEP of all threads has reached the LEP corresponding to the current GEP; one thread comprises code to perform an internal acquire to acquire a lock on its respective LEP; and at least one other threads comprises code to perform an external release to force advancement of the current LEP of said one thread, but wherein the external release will be blocked if said thread has performed the internal acquire.

20 Claims, 2 Drawing Sheets

(56) References Cited

U.S. PATENT DOCUMENTS

| | | | |
|---|---|---|---|
| 2010/0107168 A1* | 4/2010 | Auerbach | G06F 9/4887 |
| | | | 718/103 |
| 2016/0110403 A1* | 4/2016 | Lomet | G06F 16/2255 |
| | | | 707/695 |
| 2016/0267024 A1 | 9/2016 | Bowler | |
| 2016/0283540 A1* | 9/2016 | Barber | G06F 16/182 |
| 2019/0129845 A1* | 5/2019 | Gidra | G06F 12/0253 |
| 2020/0004577 A1 | 1/2020 | Parkinson et al. | |

OTHER PUBLICATIONS

Turon, Aaron, "Lock-freedom without garbage collection", Retrieved from: https://aturon.github.io/blog/2015/08/27/epoch/, Aug. 27, 2015, 15 Pages.

"International Search Report and Written Opinion Issued in PCT Application No. PCT/US2019/037406", Mailed Date: Aug. 23, 2019, 10 Pages.

Examiner Initiated Interview Summary Issued in U.S. Appl. No. 16/043,152.

Final Office Action Issued in U.S. Appl. No. 16/043,152.

Non Final Office Action Issued in U.S. Appl. No. 16/043,152.

Office Action Received for European Application No. 19735049.9, mailed on Dec. 8, 2023, 7 pages.

* cited by examiner

MANAGING GLOBAL AND LOCAL EXECUTION PHASES

BACKGROUND

Threads are portions of code which can, at least for a time, be run independently of one another, and which can be run concurrently or in parallel with one another. Concurrency refers to the case where threads are interleaved with one another through the same execution unit of a processor, thus providing an effectively simultaneous form of execution. Parallelism refers to the case where threads are executed truly simultaneously through different parallel execution units. In a given program or set of programs, two or more threads of the program may be run concurrently and/or in parallel at any one time, depending on the resources of the system.

Threads can take the form of hardware threads or software threads. In the case of hardware threads, the processor itself comprises hardware support for each thread, at least in the form a set of context registers for each of the threads that can be run concurrently or in parallel at any one time. Each set of context registers stores a program state of a respective thread, such as the program counter and operands. In the case of software threads, the concurrency or parallelism is achieved not (or not only) though hardware support for each thread, but rather the thread states are maintained at a higher level in software. Either way, in many cases the threads may be scheduled for execution by the operating system running on the computer system. The threads in question may comprise threads of the operating system itself or threads of one or more applications run on the operating system.

One task which a thread may perform is memory allocation and deallocation. Typically the operating system comprises a memory page table which maps a physical memory space of one or more physical memory devices to a virtual address space. From amongst this virtual address space, a software process can allocate one or more blocks of memory to be made available to the software for performing a particular task or tasks. Metadata is associated with the virtual address space in order to record which blocks are currently allocated. The data structure comprising the virtual memory space and the metadata is sometimes referred to as the "arena". When blocks of the virtual memory space are no longer needed, the software should make sure it de-allocates the blocks to be made available for other tasks.

A popular approach to memory management in highly concurrent systems is to use execution phases (sometimes referred to as "epochs"). Time is split into epochs, and each thread in the system must agree on which epoch the system is currently in in order to advance the epoch. That is, each thread will operate in a local execution phase (or local epoch) and the system (or program) will operate in a global execution phase (or global epoch). The global epoch can only be advanced if all threads are operating in the same local epoch. When a thread attempts to access something in a racy fashion, the epoch is prevented from advancing. When a thread attempts to deallocate an object (or block of memory), the thread removes it from the data structure, and then waits a sufficient number of epochs before deallocating the object. This ensures that no other thread can be accessing the object when it is eventually de-allocated.

For instance, in an epoch-based memory management system, a thread wishing to de-allocate a memory block must generally wait until it knows that no other thread retains a local pointer (e.g. is reading the memory block) to the memory block before de-allocating it. Otherwise, the local pointer may lead to unwanted behaviour. A problem with this approach is that if a thread stalls in the middle of a data structure operation, all other threads may be prevented from claiming any blocks.

SUMMARY

There is a problem with current systems that implement memory management using execution phases (or epochs) in that if any thread does not agree on the current epoch, and thus prevents the epoch from advancing, then the system can fail to make progress, for instance, the deallocation of memory can be prevented. With memory de-allocation, one stalled thread can prevent all other threads from de-allocating memory.

To address this such problems or similar, to prevent any thread from holding up the execution of the other threads (e.g. a deadlock), the threads may be configured to utilize a system of one or more asymmetric locks. The asymmetric lock can, under certain conditions, be overridden to force the advancement of that thread's local epoch. This allows all of the threads to operate in the same local epoch and to thus advance the global epoch.

More generally, it has been recognized that the disclosed asymmetric lock and local-global execution phase method can be used in any system of threads having potential dependencies there between.

According to one aspect disclosed herein, there is provided a method of running a program comprising a plurality of concurrent threads on a computer. At any given time the program is in a current one of a sequence of global execution phases; each of the threads is divided into a respective sequence of local execution phases each corresponding to a different corresponding one in the sequence of global execution phases. At any given time the thread is in a current one of the respective sequence of local execution phases, and the current local execution phase is not allowed to progress beyond the local execution phase in the respective sequence that corresponds to the current global execution phase. Any of the threads is able to advance the global execution phase to the next in the sequence of global execution phases on condition that the current local execution phase of all of the threads has reached the local execution phase in the respective sequence that corresponds to the current global execution phase. One of the threads comprises code to perform an internal acquire to acquire a lock on its respective local execution phase, and at least one other of the threads comprises code to perform an external release to force advancement of the current local execution phase of said one of the threads. The external release will be blocked if said one of the threads has performed the internal acquire.

According to another aspect disclosed herein there is provided software (e.g. an operating system) embodied on a computer-readable medium and configured so as when run on one or more processors to perform operations in accordance with any of the methods disclosed herein.

According to another aspect disclosed herein, there is provided a computer system comprising one or more processors and memory comprising one or more memory units arranged to store code arranged to run on the one or more processors, the code being configured so as when run to perform operations in accordance with any of the methods disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments disclosed herein and to illustrate how such embodiments may be put into effect, reference is made, by way of example only, to the accompanying drawings in which.

DETAILED DESCRIPTION OF EMBODIMENTS

Figure 1:
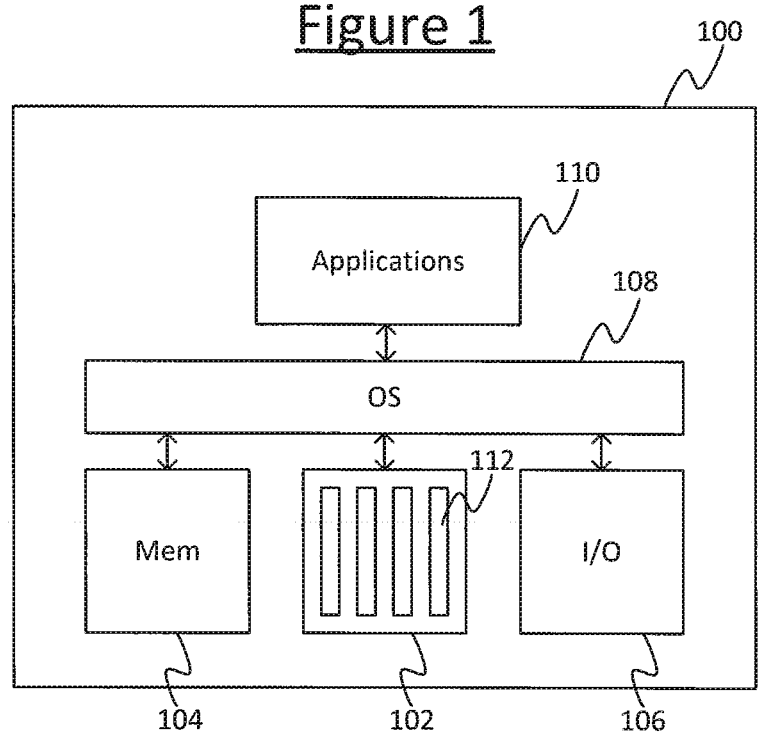
FIG. 1 is a schematic block diagram of a computer system.

FIG. 1 shows a computer system 100 in accordance with embodiments disclosed herein. The computer system 100 comprises: processing apparatus 102, memory 104, and one or more I/O devices 106. The memory 104 stores an operating system 108 and one or more applications 110. The operating system 108 is arranged to run on the processing apparatus 102, and the one or more applications 110 are arranged to run on the operating system 102 on the processing apparatus 102. The operating system 108 is configured to schedule the application(s) 110 for execution and to mediate access to the memory 104 and I/O resources 106 by the application(s) 110.

The memory 104 is also operable to store data to be accessed or operated on by the operating system 108 and/or application(s) 110, or to store data resulting from operations performed by the operating system 108 and/or applications 110. The memory 104 on which the operating system 108, application(s) 110 and data are stored may comprise one or more memory devices employing one or more memory media, e.g. electronic memory such as flash memory or a solid state drive (SSD); or a magnetic memory such as a hard-disk dive (HDD). Each of the operating system 108, applications 110 and data may be stored on a single memory device or distributed across multiple memory devices. The program code of the operating system 108 and applications 110 and data may be stored in different regions of the same one or more memory devices as the data, or on a different one or more memory devices than the data. Similarly, the operating system 108 may be stored in different regions of the same one or more memory devices as the applications 110, or a different one or more memory devices; and in the case of multiple applications 110 these may be stored in different regions of the same or more memory device, or some or all of them may be stored in different one or more memory devices than each other. The memory device(s) may be internal to the same housing as the processing apparatus or be external to it, or may comprise a combination of internal and external devices.

The processing apparatus 102 is arranged to run multiple concurrent or parallel threads 112. These may be threads of the operating system 108 itself and/or threads of one or more of the applications 110. The processing apparatus 102 on which the operating system 108 and application(s) 110 are run, including the threads 112, may comprises one or more processors comprising one or more cores. In the case of multiple processors these may be implemented on the same computer terminal or distributed across multiple computer units at multiple computer units at different locations, e.g. different chassis in the same data centre, different terminals on the same local area network, or different geographic locations networked together via a wide-area network such as the Internet.

For instance, the threads 112 may comprise: different threads on a same processor core, threads on different processor cores, threads on different cores on the same die or IC package, threads on different IC packages in the same board, threads on different boards connected together in a same data centre, threads on different devices connected together over a local-area and/or wide-area network (e.g. the Internet or a mobile cellular network such as a 3GPP network), or any combination of these. Note therefore that in some embodiments the operating system 108 may take the form of a distributed operating system. Also, in embodiments the memory 104 may comprise multiple memory devices distributed across multiple locations. Where desired, distributed computing techniques in themselves are known in the art.

Figure 2:
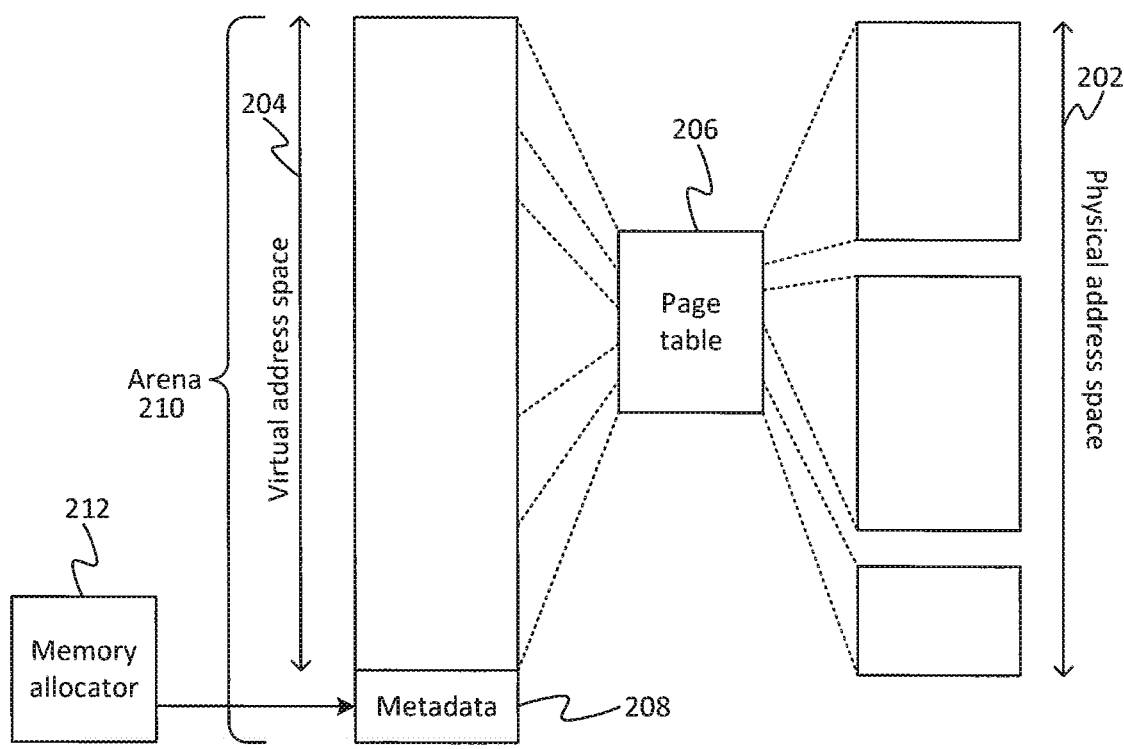
FIG. 2 schematically illustrates a mapping of physical to virtual memory spaces, and FIG. 3 schematically illustrates a plurality of threads claiming tasks from a queue of work items.

FIG. 2 illustrates a memory mapping an allocation scheme that may be employed by the operating system 108 to manage access to the memory 104 or at least parts thereof. The memory 104 comprises a physical address space 202 across one or more memory devices, i.e. the actual hardware addresses by which the physical regions of memory in those one or more memory devices are addressed. The physical memory space 202 in question may comprise a memory space of one or more volatile memory devices (RAM) and/or one or more non-volatile memory devices (e.g. flash, SSD or HDD).

The operating system 108 comprises a memory page table 206 which maps the physical addresses of the physical address space 202 onto corresponding virtual addresses of a virtual address space 204. The operating system 108 also maintains a portion of metadata 208 associated with the virtual memory space 204. This metadata 208 is used for "book keeping", to record which blocks of the virtual memory space 204 are allocated for which software tasks. Together the virtual memory space 204 and the associated metadata 208 are referred to as an "arena" 210. A component known as a memory allocator 212 is responsible for recording in the metadata 208 that a specified block or blocks or the virtual memory space 204 is/are to be reserved, so they can be used for a certain task. A first entry in the metadata 208 may record that a first block of memory 302 in the virtual memory space 204 is currently allocated, and a second entry in the metadata 208 may record that a second block of memory in the virtual memory space is also currently allocated (it will be appreciated that this is just of illustration an in practice there may be many more reserved blocks and corresponding entries in the metadata). The memory allocator 212 can also de-allocate the block(s) again at the end of the task using that space, by removing the association recorded in the metadata 208, in order to thereby release that memory space for use in performing other, future tasks. Note that the metadata 208 does not need to record what tasks the blocks are allocated for, just the fact that they are currently allocated, so that they cannot be used by another task until released.

The page table 206 and arena 210 take the form of data structures which may be implemented in any one or more memory devices of the memory 104. The memory allocator 212 may be a component of the operating system 108 or the application(s) 110.

In a multi-threaded environment, each of multiple threads 112 may comprise its own respective instance of a memory allocator 212. This can result in contention, i.e. competition for the same resource by different entities—in this case competition for access to the metadata 208 by the allocators 212 of the different threads 112. For the system 100 to function properly, it should not be allowed that different threads 112 try to manipulate the metadata 208 of the same arena 210 at the same time.

The conventional solution is to implement a lock on the arena 210 (or more specifically a lock on access to the metadata 208). That is, when the allocator 212 of one thread 112 wishes to access the metadata 208 to manipulate it (to allocate or deallocate one or more blocks) then the thread in question acquires a lock on the metadata 208. This prevents any other threads 112 accessing the metadata 208 until the thread that acquired the lock releases the lock again.

An issue with this however is that it results in a lot of latency (i.e. delay): threads have to wait a lot for access to the metadata 208. Put another way, the lock creates a "bottleneck" in the allocation and deallocation of memory.

Figure 3:
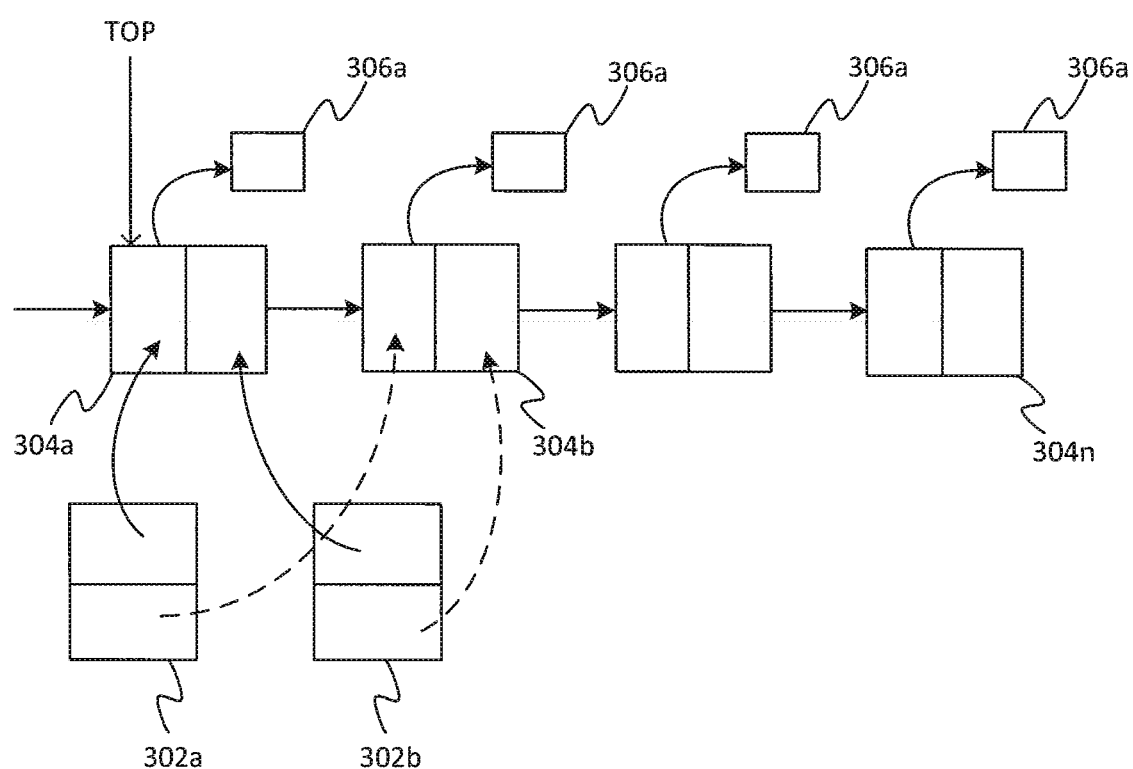

Embodiments of the present disclosure provide a method of running a program having a plurality of concurrent or parallel threads. FIG. 3 shows an example implementation of the present invention. A program has a plurality of concurrent threads 302a, 302b. Whilst only two threads are shown in this example, the program may in general have any number of threads greater than one. The threads are shown "claiming" work items 304 from a queue of work items 304a, 304b, ... 304n. Each work item may comprise one or more tasks 306a, 306b, ... 306n. Thread 302a is shown claiming a respective task 304 from work items 304a and 304b. Similarly, thread 302b is shown claiming a respective task 304 from work items 304a and 304b. An asymmetric lock scheme is used that enables a local execution phase of a thread to be advanced in order to advance the global execution phase of a program. However, under certain conditions the local execution phase of a thread 302 cannot be forced to advance, hence the asymmetry. Herein, the term "execution phase" is intended to be synonymous with "epoch" (wherein the term epoch is not used in any proprietary sense).

For highly concurrent data-structures memory management can be challenging. Epoch-based resource management is one efficient approach to handling this, but has issues if a thread is suspended as the system can no longer re-use resources.

At any point in time, a program operates in a current one of a sequence of global execution phases. The current global execution phase will be denoted N. A global execution phase may in general be any division of time. The phases run in a contiguous sequence. The sequence may have a count, which denotes the progression of time (or similarly the progression of phases through the sequence). For example, the count may be a count of integer numbers (e.g. 1, 2, 3, etc.) For example, the program may be in a global execution phase that corresponds to (e.g. equals) phase 8. The count may reset after a predetermined amount of time or increments of the count. Alternatively, there may be no upper limit to the count and the count increases indefinitely.

The count of the global execution phase is held in a part of the memory 104. In embodiments it may be maintained by the operating system 108, or by the application 110 (e.g. by a supervising one of the threads of the operating system 108 or the application 110).

As well as the global execution phase, each thread 302 of the plurality of concurrent or parallel threads operates in a current one of a respective local execution phase, which again runs in a contiguous sequence (e.g. 1, 2, 3, etc.). Each local execution phase corresponds to one of the global execution phases. That is, the program, if currently in a given global execution phase N, has previously operated in global execution phases N−1, N−2, N−3, etc., and each thread can only operate in a local execution phase corresponding to the current global execution phase N, or to a previous global execution phase (e.g. N−1). A thread 302 cannot operate in a local execution phase that corresponds to a global execution phase with a count greater than the current global execution phase N. That is, the local execution phase of a given thread cannot progress beyond the current global execution phase N.

Furthermore, the current global execution phase N cannot be advanced to the next global execution phase N+1 until each thread 302 is in a local execution phase corresponding to the current global execution phase N. That is, the count of the local execution phase of each thread 302 must equal the count of the program's global execution phase N before the global execution phase can advance. For example, if the current global execution phase is 8, each thread 302 must have a local execution phase equal to 8 in order for the global execution phase to be increased to 9. In this sense, the global execution phase acts as a "co-operative clock" and each thread 302 must agree on the current "time" in order to advance the clock.

In general, the count of the local execution phase does not necessarily have to equal the count of the global execution phase so long as the count of the local execution phase corresponds to that of the global execution phase. For example, the sequence of the global execution phase could be counted in integer numbers (0, 1, 2, 3), whilst the sequence of the local execution phase could be counted in a sequence of multiples (e.g. 2, 4, 6, etc.) or decimal numbers (0.1, 0.2, 0.3, etc.). The point is that the local execution phases must map to (or correspond to) the global execution phases. It will be appreciated that the particular identifiers given to each phase is just a matter of arbitrary labelling and, however labelled, in essence the phases fall in an ordered temporal sequence such that any phase in the ordered sequence of local execution phases for a given thread 302 has a counterpart the same number of phases into the ordered sequence of global execution phases.

The local execution phases for each thread 302 is held in a part of the memory 104. The local execution phase of each thread may be maintained by the respective thread, or centrally such as by a supervising thread of the operating system 108 or application 110.

At least one of the threads 302 comprises code to perform an internal acquire to acquire a (asymmetric) lock on its respective local execution phase. The lock prevents the respective local execution phase of that thread from being advanced. The acquisition is "internal" in that the thread 302 in question is locking its own local execution phase (its own epoch). In embodiments, the thread 302 comprising the code to perform said internal acquire may be the thread responsible for (e.g. able to) write to the queue of work items 304. In some examples, only one thread 302 can write to the queue of work items 304. In some examples, more than one thread 302 may comprise code to perform an internal acquire to acquire a lock on its respective local execution phase. As another example, each of the threads 302 may comprise code to acquire a lock on its respective local execution phase. However, in embodiments only a single thread 302 can perform an internal acquire during a given global execution phase. For example, if the current global execution phase is 8, only one thread can perform an internal acquire during global execution phase 8.

A thread 302 may perform an internal acquire to acquire a lock on its respective local execution phase when performing a "dangerous" operation. A dangerous operation may be, for example, accessing an object in a lock-free data structure: the data structure is not guaranteed to still contain the object, the internal acquire prevents it from being deallocated. More generally, a dangerous operation may be anything which involves a dependency between threads.

In embodiments, each of one, some or all of the threads 302 is configured to traverse a queue of work items 304 (that have been generated by one or more of the threads 302) in order to find work items that it can claim in order to perform. Each work item 302 may comprise an indication of at least one block of memory and a task to be performed using that at least one block of memory. The work item(s) 302 generated in a given execution phase (or epoch) must not be performed until the next (or a subsequent) epoch. The threads 302 may divide the work items 304 to be performed in any manner, as long as no more than one thread 302 attempts to process any given work item. For example, when the global execution phase is advanced, each thread 302 could process the work items it generated itself in the previous global execution phase. Another approach is for the thread 302 that advances the global execution phase to handle all of the work items 304 generated (by all of the threads 302) in the previous global execution phase.

The queue of work items 304 is held in a part of the memory 104. The queue may be maintained by a thread 302 (e.g. a supervising thread) of the operating system 108 or the application 110.

In embodiments, one, more or all of the threads 302 may comprise code to perform an external acquire to acquire a lock on the current local execution phase of another thread other than itself.

Each thread 302 may claim a respective one or more of the work items from the queue to process. A thread 302 that claims a work item 304 performs one or more tasks 306 in relation to the work item 304 in the current local execution phase of that thread 302. The task(s) 306 are performed using at least one block of memory allocated to that task 306 from amongst a memory space (in embodiments, the virtual memory space 204). It is desirable to ensure that only one thread 302 is performing a task of a given work item. Multiple threads 302 scan the queue of work items at the same time looking for a work item 304 to claim. Therefore a thread 302 must claim a block of memory so that other threads do not attempt to work on the same work item 304. Whilst working on a task using the at least one block of memory, that block of memory is not available for use by any other thread 302. Whilst a thread 302 is performing a task 306 it cannot advance its local execution phase. However, as discussed above, the global execution phase can only be advanced once all threads share the same local execution phase and only if that local execution phase corresponds to the global execution phase. Therefore, whilst a thread is busy performing a task, the global execution phase cannot be advanced and a lag develops.

In order to prevent this problem from occurring (i.e. the global execution phase being stalled), at least one other thread 302 (i.e. a thread other than the thread that has acquired a lock on its own respective local execution phase) comprises code to perform an external release to force advancement of the current local execution phase of said one of the threads. The external release causes the local execution phase of the blocking thread (blocking in the sense that that thread is blocking or preventing the global execution phase being advanced) to advance to the next phase in the sequence of local execution phases (e.g. from phase 7 to phase 8).

However, the external release will be blocked if a thread 302 has performed an internal acquire. That is, an external release cannot cause the respective local execution phase of a thread to advance to the next phase in the sequence if that thread has already performed an internal acquire during its current local execution phase. This may, for example, prevent the local execution phase of the thread being advanced if the thread is doing something dangerous. Examples of dangerous are described above.

A thread 302 that comprises code for performing an internal acquire may also comprise code for performing an internal release subsequent to said internal acquire. The internal acquire is typically associated with performing an action that will advance the local execution phase relatively quickly, and therefore does not need to be advanced by an external release. I.e. if it known that a thread has performed an internal acquire, it can be assumed it is not "stuck" and has entered a piece of code that will shortly end with an internal release. The internal release function releases the lock on the local execution phase of the thread calling the internal release. The internal release causes the respective local execution phase to advance. This enables the local execution phase of that thread to advance to the current corresponding global execution phase.

Example pseudocode for performing an internal acquire is as follows:

```
use_epoch
    internal_acquire
    update epoch
    -
    -
    -           dangerous operations
    -
    -
    internal_release
```

Here, an internal acquire is performed to acquire a lock on the threads local execution phase. After the operations are complete, the thread performs an internal release to release the lock on the local execution phase.

Example pseudocode for advancing the epoch using external acquire is as follows:

```
advance_epoch
    internal_acquire
    e = global_epoch
    for every other thread t,
        if t.epoch != e
            if t.try_external_acquire
                t.epoch = global_epoch
                t.external_release
            else
                return false
    global_epoch = e + 1;
    internal_release
    return true
```

Here try_external_acquire returns true if it managed to acquire the external version of the lock.

The internal acquire and internal release functions are fast functions, whereas the external acquire and external release functions are slow functions. A thread can only perform an internal acquire and release on its own local execution phase (not those of other threads). A thread can only perform an external release if it has already successfully performed an external acquire. Similarly, a thread can only perform an internal release if it has already successfully performed an internal acquire. In embodiments, only one thread 302 can perform an internal acquire and internal release during any given one of the global execution phases. In contrast, any of the other threads 302 can perform an external acquire and/or external release. If two acquire functions are called, there will only ever be one winner, i.e. only one function will succeed. The functions may be configured such that a slow (external) function can stop another slow (external) function, a slow (external) function can stop a fast (internal) function, and a fast (internal) function can stop a slow (external) function.

The functions may be further configured such that a fast (internal) function cannot stop a fast (internal) function. Here, the winner may be determined based on the time at which the functions are called. For example, if two slow functions (e.g. an external acquire and an external acquire), are called by two different threads (thread 1 and thread 2 respectively), the first function to be called will win (i.e. be performed). That is, if thread 1 calls an external acquire at time t1 and thread 2 calls an external acquire at time t2>t1, thread 1's external acquire will succeed.

In summary, an internal acquire is used to acquire a lock on a thread's (i.e. the thread calling the internal acquire) local execution phase. An internal release is used to release the lock on the local execution phase of a thread who has previously performed an internal acquire. In contrast, an external acquire is performed by a thread to acquire a lock on a different thread's local execution phase. This is used to advance the execution phase of another thread. An external release is used to release the lock on the local execution phase of a thread whose local execution phase was locked by an external acquire.

In terms of cost (e.g. processing cost and/or latency cost), an internal acquire function costs very little. In contrast, a global synchronization is relatively expensive. However, the inventors have recognised that the cost of a relatively uncommon global synchronisation is balanced by the small cost of a more common internal acquire, such that it is preferred to prior systems whose threads hold onto memory blocks for too long when a thread becomes stuck.

Once the local execution phase of each thread 302 corresponds to the current global execution phase N (e.g. phase 8), any of the plurality of threads 302 may advance the current global execution phase to the next phase in the sequence (e.g. from 8 to 9). In order to do this, one of the threads 302 (i.e. the thread initiating the advance of the global execution phase). Various heuristics can be chosen to determine when to advance the global epoch. For example, it can be advanced when there is sufficient work (e.g. state to be deallocated) that requires the epoch to be advanced.

If a thread claims a work item 304 during its current local execution phase, the thread 302 may be configured to finish performing a task 306 associated with that work item 304 in the respective current local execution phase of the thread 302. The task 306 may be performed using one or more blocks of memory allocated to that task 306 from amongst the memory space (e.g. the virtual memory space 204). The thread 302 performing a task 306 may be configured to de-allocate the one or more blocks of memory only in the next or a subsequent one of the local execution phases. That is, the block(s) of memory may not be de-allocated during the current local execution phase of the thread 302. Instead, the thread 302 must wait until at least the next phase in the sequence of local execution phases to de-allocate the blocks of memory. For example, if the thread 302 is in a local execution phase of 8, the thread 302 must wait until at least local execution phase 9 to de-allocate the blocks. In some examples, the thread 302 must wait at least two subsequent phases to de-allocate the blocks (e.g. phase 10). In other examples, the thread 302 must wait at least three subsequent phases to de-allocate the blocks (e.g. phase 11). This adds a "window" between removing a block of memory from a data structure and de-allocating it which is particularly advantageous in the case where another thread may be looking at (e.g. reading) the block. For example, if the global execution phase is successfully incremented twice from the phase in which a task was claimed (or in which memory blocks were allocated), then no references could exist to the memory block(s) that are to be de-allocated.

It will be appreciated that the above embodiments have been described by way of example only. Other applications or variants of the disclosed techniques may become apparent to a person skilled in the art given the disclosure herein. The scope of the present disclosure is not limited by the above-described embodiments but only by the accompanying claims.

The invention claimed is:

1. A method of running a program comprising a plurality of concurrent threads on a computer, wherein each of the plurality of concurrent threads is divided into a respective sequence of local execution phases, wherein each of the local execution phases correspond to a different corresponding phase in a sequence of global execution phases, and wherein any of the plurality of concurrent threads is able to advance the global execution phase to a next global execution phase in the sequence of global execution phases based on a current local execution phase of all of the plurality of concurrent threads having reached a local execution phase that corresponds to a current global execution phase, the method comprising:

determining that a thread from the plurality of concurrent threads is in a current one of the respective sequence of local execution phases that is not allowed to progress beyond the local execution phase in the respective sequence that corresponds to a current global execution phase;

receiving, from the thread, code to perform an internal acquire to acquire a lock on a respective local execution phase of the thread;

based on the received code from the thread to perform the internal acquire, performing the internal acquire to acquire the lock on the respective local execution phase, the lock preventing the respective local execution phase from advancing;

receiving, from the thread, code to perform an internal release of the internal acquire, the internal release causing an advancement of the current local execution phase of the thread, the thread being the only thread that comprises code to perform the internal acquire and the internal release subsequent to the internal acquire, wherein when the thread performs the internal acquire it is the only thread of the plurality of concurrent threads that is able perform an internal acquire during a global execution phase corresponding to the respective local execution phase of the thread that performed the internal acquire; and based on the received code from the thread to perform the internal release, performing the internal release to release the lock and enabling the local execution phase to advance.

2. The method of claim 1, wherein the thread is the only thread that is allowed to perform an external release.

3. The method of claim 1, further comprising: blocking an external release not performed by the thread.

4. The method of claim 1 wherein one other of the plurality of concurrent threads further comprises code to perform an external acquire to acquire a lock on the current local execution phase of the thread.

5. The method of claim 1, wherein a further one of the plurality of concurrent threads comprises code to perform an external acquire, and wherein only one of an external release and the external acquire will succeed.

6. The method of claim 1, further comprising maintaining a queue of work items, wherein each thread claims a respective one or more of the work items from the queue to process.

7. The method of claim 6, wherein each work item comprises an indication of at least one block of memory and a task to be performed using that at least one block of memory.

8. The method of claim 7, wherein the thread is configured to finish performing a task in the respective current local execution phase, the task being performed using at least one block of memory allocated to that task from amongst a memory space; and wherein the thread is configured to de-allocate said at least one block of memory only in the next or a subsequent one of the local execution phases.

9. The method of claim 1, wherein said memory space is a virtual memory space mapped from a physical memory space of one or more physical memory devices.

10. The method of claim 1, wherein the plurality of concurrent threads are operating system threads.

11. The method of claim 10, wherein the plurality of concurrent threads are scheduled by the operating system.

12. The method of claim 1, wherein the plurality of concurrent threads are threads of a distributed garbage collection system.

13. The method of claim 1, wherein the plurality of concurrent threads comprise different threads on a same processor core.

14. The method of claim 1, wherein the plurality of concurrent threads comprise threads on different processor cores.

15. The method of claim 11, wherein the plurality of concurrent threads comprise threads on different cores on the same die or IC package.

16. The method of claim 11, wherein the plurality of concurrent threads comprise threads on different IC packages in the same board.

17. The method of claim 11, wherein the plurality of concurrent threads comprise threads on different boards connected together in a same data center.

18. The method of claim 1, wherein the plurality of concurrent threads comprise threads on different devices connected together over a wide-area network.

19. A computer-readable hardware storage device comprising computer-executable instructions for running a program comprising a plurality of concurrent threads on a computer, wherein each of the plurality of concurrent threads is divided into a respective sequence of local execution phases, wherein each of the local execution phases correspond to a different corresponding phase in a sequence of global execution phases, and wherein any of the plurality of concurrent threads is able to advance the global execution phase to a next global execution phase in the sequence of global execution phases based on a current local execution phase of all of the plurality of concurrent threads having reached a local execution phase that corresponds to a current global execution phase, the computer-executable instructions when executed by one or more processors, cause the one or more processors to perform the following operations:

determining that a thread from the plurality of concurrent threads is in a current one of the respective sequence of local execution phases that is not allowed to progress beyond the local execution phase in the respective sequence that corresponds to a current global execution phase;

receiving, from the one of the threads, code to perform an internal acquire to acquire a lock on a respective local execution phase of the one of the threads;

based on the received code from the one of the threads to perform the internal acquire, performing the internal acquire to acquire the lock on the respective local execution phase, the lock preventing the respective local execution phase from advancing;

receiving, from the one of the threads, code to perform an internal release of the internal acquire, the internal release causing an advancement of the current local execution phase of the one of the threads, the one of the threads being the only thread that comprises code to perform the internal acquire and the internal release subsequent to the internal acquire, wherein when the thread performs the internal acquire it is the only thread of the plurality of concurrent threads that is able perform an internal acquire during a global execution phase corresponding to the respective local execution phase of the thread that performed the internal acquire; and based on the received code from the one of the threads to perform the internal release, performing the internal release to release the lock and enabling the local execution phase to advance.

20. A computer system for running a program comprising a plurality of concurrent threads on a computer, wherein each of the plurality of concurrent threads is divided into a respective sequence of local execution phases, wherein each of the local execution phases correspond to a different corresponding phase in a sequence of global execution phases, and wherein any of the plurality of concurrent threads is able to advance the global execution phase to a next global execution phase in the sequence of global execution phases based on a current local execution phase of all of the plurality of concurrent threads having reached a local execution phase that corresponds to a current global execution phase, the system comprising;

one or more processors; and a memory comprising one or more memory units arranged to store code arranged to cause the one or more processors to perform the following operations:

determining that a thread from the plurality of concurrent threads is in a current one of the respective sequence of local execution phases that is not allowed to progress beyond the local execution phase in the respective sequence that corresponds to a current global execution phase;

based on an operation being performed by the thread, receiving, from the one of the threads, code to perform an internal acquire to acquire a lock on a respective local execution phase of the one of the threads;

based on the received code from the one of the threads to perform the internal acquire, performing the internal acquire to acquire the lock on the respective local execution phase, the lock preventing the respective local execution phase from advancing;

receiving, from the one of the threads, code to perform an internal release of the internal acquire, the internal release causing an advancement of the current local execution phase of the one of the threads, the one of the threads being the only thread that comprises code to perform the internal acquire and the internal release subsequent to the internal acquire, wherein when the thread performs the internal acquire it is the only thread of the plurality of concurrent threads that is able perform an internal acquire during a global execution phase corresponding to the respective local execution phase of the thread that performed the internal acquire; and based on the received code from the one of the threads to perform the internal release, performing the internal release, the internal release causing a release of the lock and enabling the local execution phase to advance.

* * * * *